(12) United States Patent
Kang

(10) Patent No.: US 11,192,499 B2
(45) Date of Patent: Dec. 7, 2021

(54) SYSTEM AND METHOD OF AVOIDING REAR-CROSS TRAFFIC COLLISION

(71) Applicant: HYUNDAI MOBIS CO., LTD., Seoul (KR)

(72) Inventor: Eun Seok Kang, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 17/084,536

(22) Filed: Oct. 29, 2020

(65) Prior Publication Data
US 2021/0129749 A1 May 6, 2021

(30) Foreign Application Priority Data
Oct. 31, 2019 (KR) .................. 10-2019-0137694

(51) Int. Cl.
B60Q 1/00 (2006.01)
B60Q 9/00 (2006.01)
G08G 1/16 (2006.01)
B60W 30/095 (2012.01)
B60W 50/14 (2020.01)

(52) U.S. Cl.
CPC ......... B60Q 9/008 (2013.01); B60W 30/0956 (2013.01); B60W 50/14 (2013.01); G08G 1/166 (2013.01); B60W 2420/52 (2013.01); B60W 2554/4041 (2020.02); B60W 2554/4044 (2020.02); B60W 2554/801 (2020.02)

(58) Field of Classification Search
CPC ... B60Q 9/008; B60W 50/14; B60W 30/0956; B60W 2420/52; B60W 2554/4044; B60W 2554/801; B60W 2554/4041; G08G 1/166
See application file for complete search history.

(56) References Cited

U.S. PATENT DOCUMENTS

| 8,126,609 | B2* | 2/2012 | Kimura | B60W 10/18 701/29.2 |
| 9,834,210 | B2* | 12/2017 | Ohbayashi | B60W 10/18 |
| 10,882,516 | B2* | 1/2021 | Morotomi | G01S 13/931 |
| 10,913,392 | B2* | 2/2021 | Morimura | G06K 9/00805 |
| 2008/0306666 | A1* | 12/2008 | Zeng | B60Q 9/006 701/70 |

FOREIGN PATENT DOCUMENTS

KR 101843251 3/2018

* cited by examiner

Primary Examiner — Toan N Pham
(74) Attorney, Agent, or Firm — H.C. Park & Associates, PLC

(57) ABSTRACT

A system configured to avoid a rear-cross traffic collision includes an obstacle detection unit detecting a position of an obstacle by receiving electromagnetic waves reflected off a reflection point of the obstacle; a direction estimation unit estimating a traveling direction of the obstacle on the basis of the position of the obstacle detected by the obstacle detection unit; and a collision determination unit determining possibility of a collision with the obstacle on the basis of the traveling direction of the obstacle estimated by the direction estimation unit.

13 Claims, 8 Drawing Sheets

SYSTEM AND METHOD OF AVOIDING REAR-CROSS TRAFFIC COLLISION

CROSS REFERENCE TO RELATED APPLICATION

This application claims priority to from and the benefit of Korean Patent Application No. 10-2019-0137694, filed Oct. 31, 2019 which is hereby incorporated by reference for all purposes as if fully set forth herein.

BACKGROUND

Field

The inventive concepts relate to a system and a method of avoiding a rear-cross traffic collision. More particularly, the inventive concepts relate to a system and a method of detecting, when a vehicle stops or reverses, an obstacle of which a traveling direction crosses a traveling direction of the vehicle, and warning the driver of the obstacle.

Discussion of the Background

As advanced technologies related to autonomous driving of a vehicle have been developed, various vehicle safety technologies have been developed considering convenience and safety for drivers. The safety technologies have been applied to actual vehicles.

Specifically, technologies for determining possibility of a collision between a particular vehicle and another vehicle or an obstacle and thus warning the driver of the particular vehicle or controlling the particular vehicle have been developed. Among the technologies, the Rear-Cross Traffic Collision Warning (RCCW) function is a function that recognizes, when a vehicle stops or reverses, an obstacle approaching from the side and warns the driver.

However, the Rear-Cross Traffic Collision Warning function recognizes the obstacle approaching the particular vehicle, by using radar. Therefore, there is a problem that a position of a reflection point on the obstacle recognized by the radar through reflection varies depending on the distance to the particular vehicle.

Accordingly, in the related art, as the reflection point on the obstacle giving reflection back to the radar moves, it is erroneously recognized that the obstacle traveling parallel to the particular vehicle will collide with the particular vehicle.

The foregoing is intended merely to aid in the understanding of the background of the present disclosure, and is not intended to mean that the present disclosure falls within the purview of the related art that is already known to those skilled in the art.

SUMMARY

The present disclosure is directed to providing a system configured to avoid a rear-cross traffic collision to address a problem of erroneously determining that the vehicle is likely to collide with an obstacle travelling parallel to a longitudinal direction of the vehicle.

Additional features of the inventive concepts will beset forth in the description which follows, and in part will be apparent from the description, or may be learned by practice of the inventive concepts.

According to the present disclosure, there is provided a system configured to avoid a rear-cross traffic collision, the system including an obstacle detection unit detecting a position of an obstacle by receiving electromagnetic waves reflected off a reflection point of the obstacle; a direction estimation unit estimating a traveling direction of the obstacle on the basis of the position of the obstacle detected by the obstacle detection unit; and a collision determination unit determining possibility of a collision with the obstacle on the basis of the traveling direction of the obstacle estimated by the direction estimation unit.

The obstacle detection unit may be connected to a radar sensor provided at each of opposite rear ends of a vehicle and may detect the position of the obstacle positioned behind or beside the vehicle.

The direction estimation unit may collect the multiple positions of the obstacle detected by the obstacle detection unit, and may use the multiple collected positions of the obstacle to calculate a ratio between a change in a longitudinal position of the obstacle and a change in a lateral position of the obstacle, thereby estimating the traveling direction of the obstacle.

The direction estimation unit may calculate the ratio between the change in the longitudinal position and the change in the lateral position that occur between an initial position of the obstacle first detected and a current position of the obstacle, thereby estimating the traveling direction of the obstacle in real time.

When an approaching angle between the estimated traveling direction of the obstacle and a lateral axis of a vehicle is within a preset angle range, the collision determination unit determines that there is no possibility of a collision with the obstacle.

The obstacle detection unit may calculate a lateral distance from the vehicle to the obstacle or a lateral speed of the obstacle by using the detected position of the obstacle, and when the amount of change in the lateral distance to the obstacle or in the lateral speed of the obstacle is equal to or less than a preset amount of change, the collision determination unit determines that there is no possibility of a collision with the obstacle.

The system may further include a reliability evaluation unit collecting the multiple traveling directions of the obstacle estimated by the direction estimation unit, and evaluating an estimated level of reliability for the traveling direction of the obstacle by using the number of the collected traveling directions and a variance or standard deviation between the collected traveling directions, wherein when the estimated level of reliability evaluated by the reliability evaluation unit is equal to or greater than a preset level of reliability, the collision determination unit determines the possibility of a collision with the obstacle on the basis of the traveling direction of the obstacle.

The obstacle detection unit may calculate a lateral distance from a vehicle to the obstacle and a lateral speed of the obstacle by using the detected position of the obstacle, and the collision determination unit may calculate time to collision on the basis of the calculated lateral distance and the calculated lateral speed, and may determine that there is the possibility of a collision with the obstacle when the obstacle is positioned within a preset area and the time to collision is equal to or less than a preset time.

The collision determination unit may set the lateral speed of the obstacle by using the lateral speed of the obstacle previously detected and the lateral speed of the obstacle currently detected on the basis of the traveling direction of the obstacle.

The collision determination unit may modify the preset area so as to exclude a part of an area adjacent to the vehicle from the preset area on the basis of the traveling direction of the obstacle.

The system may further include a notification providing unit providing a notification to a driver of a vehicle when there is the possibility of a collision with the obstacle determined by the collision determination unit.

According to the present disclosure, there is provided a method of avoiding a rear-cross traffic collision, the method including receiving electromagnetic waves reflected off a reflection point of an obstacle by a vehicle, and detecting a position of the obstacle; estimating a traveling direction of the obstacle on the basis of the detected position of the obstacle; and determining possibility of a collision with the obstacle on the basis of the detected position of the obstacle or the estimated traveling direction of the obstacle.

According to the present disclosure, the system and the method of avoiding the rear-cross traffic collision addresses a problem of erroneously determining that the vehicle is likely to collide with an obstacle moving in a direction parallel to the vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts. The above and other objectives, features, and other advantages of the present disclosure will be more clearly understood from the following detailed description when taken in conjunction with the accompanying drawings, in which.

DETAILED DESCRIPTION

Figure 1:
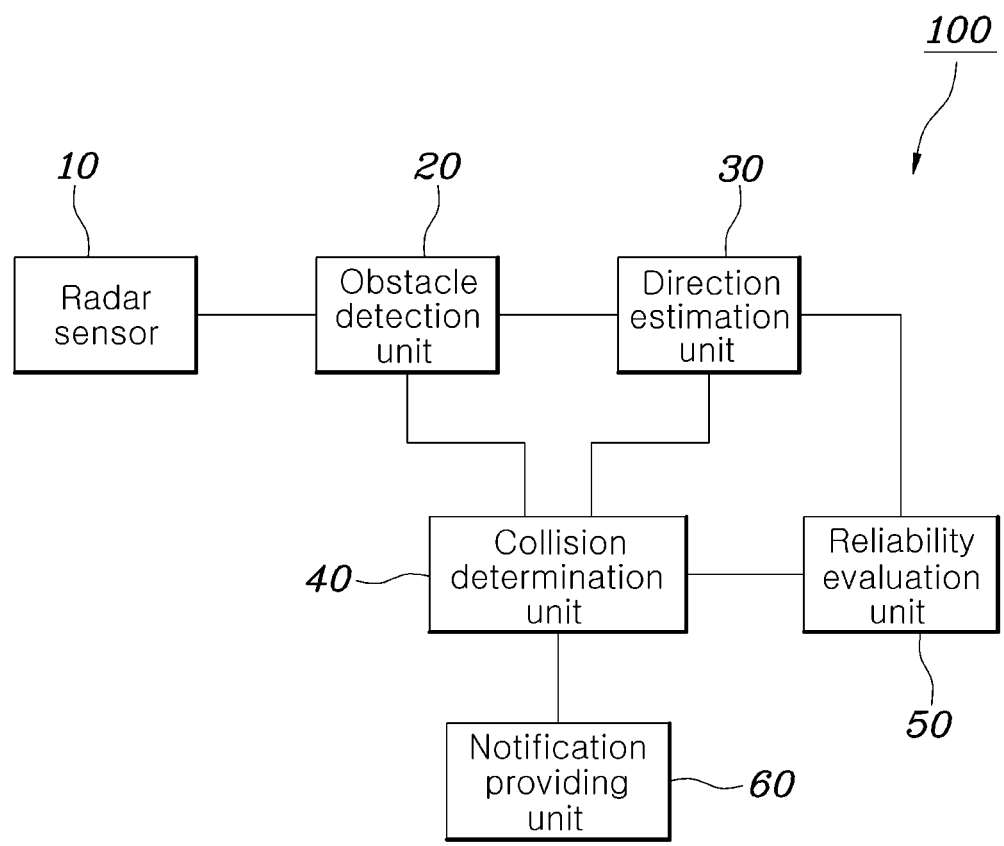
FIG. 1 is a block diagram illustrating a system configured to avoid a rear-cross traffic collision according to an embodiment of the present disclosure.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/of" includes any and all combinations of one or more of the associated listed items.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Specific structural and functional descriptions of embodiments of the inventive concepts described in the specification or application are only for illustrative purposes of the embodiments of the inventive concepts. The embodiments of the inventive concepts may be embodied in many different forms, and the embodiments of the present specification or application should not be construed as limiting the inventive concepts Because the embodiment of the present disclosure may be modified in various ways and may have various forms, particular embodiments are illustrated in the drawings and will be described in the specification or application in detail. However, the embodiment according to the concept of the inventive concepts should not be construed as limited to a particular disclosure, and it should be understood that all modifications, equivalents or alternatives falling within the idea and technical scope of the disclosure are included.

Terms "first", "second", etc. used in the specification can be used to describe various elements, but the elements are not to be construed as being limited to the terms. These terms are only used to distinguish one element from another element. For instance, a first element could be termed a second element without departing from the scope of the inventive concepts. Similarly, the second element could also be termed the first element.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present. Other words used to describe the relationship between elements, such as "between", "directly between", "adjacent", and "directly adjacent", should be construed in the same way.

The terms used in the present specification are merely used to describe particular embodiments, and are not intended to limit the inventive concepts. As used herein, the singular forms "a", "an", and "the" are intended to include the plural forms as well, unless the context clearly indicates otherwise. It is to be understood that terms such as "including", "having", etc. are intended to indicate the existence of the features, numbers, steps, actions, elements, parts, or combinations thereof disclosed in the present specification, and are not intended to preclude the possibility that one or more other features, numbers, steps, actions, elements, parts, or combinations thereof may exist or may be added.

Unless otherwise defined, all terms including technical and scientific terms used herein have the same meaning as commonly understood by those skilled in the art to which the inventive concepts belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, an exemplary embodiment of the inventive concepts will be described in detail with reference to the accompanying drawings. The same reference numerals in all the drawings denote the same member.

Figure 2:
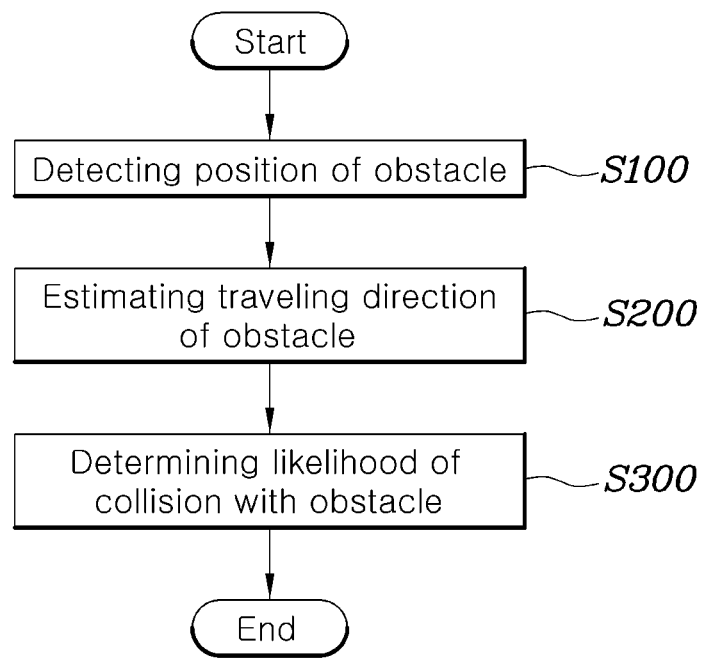
FIG. 2 is a flowchart illustrating a method of avoiding a rear-cross traffic collision according to an embodiment of the present disclosure.

FIG. 1 is a block diagram illustrating a system 100 configured to avoid a rear-cross traffic collision according to an embodiment of the inventive concepts. FIG. 2 is a flowchart illustrating a method of avoiding a rear-cross traffic collision according to an embodiment of the inventive concepts.

Referring to FIGS. 1 and 2, according to an embodiment of the inventive concepts, there is provided a system configured to avoid a rear-cross traffic collision, the system including an obstacle detection unit 20 that detects a position of an obstacle B (illustrated in FIG. 3) by receiving electromagnetic waves reflected off a reflection point of the obstacle B; a direction estimation unit 30 that estimates a traveling direction of the obstacle B on the basis of the position of the obstacle B detected by the obstacle detection unit 20; and a collision determination unit 40 that determines a possibility of a collision with the obstacle B on the basis of the position of the obstacle B detected by the obstacle detection unit 20 or the traveling direction of the obstacle B estimated by the direction estimation unit 30.

The obstacle detection unit 20, the direction estimation unit 30, the collision determination unit 40, a reliability evaluation unit 50, and a notification providing unit 60 according to an exemplary embodiment of the inventive concepts may be implemented through a non-volatile memory (not illustrated) and a processor (not illustrated), wherein the non-volatile memory is configured to store data related to an algorithm configured to control operations of various elements of a vehicle or to software instructions configured to reproduce the algorithm, and the processor is configured to perform an operations described below, by using the data stored in the memory. Herein, the memory and the processor may be implemented as separate chips. Alternatively, the memory and the processor may be implemented as an integrated single chip. The processor may be provided as a form of one or more processors.

In addition, according to an embodiment of the inventive concepts, there is provided a method of avoiding a rear-cross traffic collision, the method including receiving electromagnetic waves reflected off a reflection point of the obstacle B by the vehicle A, and detecting a position of the obstacle B at operation S100; estimating a traveling direction of the obstacle B on the basis of the detected position of the obstacle B at operation S200; and determining the possibility of a collision with the obstacle B on the basis of the detected position of the obstacle B or the traveling direction of the obstacle B estimated by the direction estimation unit 30, at operation S300.

The obstacle detection unit 20 detects a position of the obstacle B. The position of the obstacle B may be detected using various sensors, such as a radar sensor 10, an ultrasonic sensor, a lidar sensor, and the like. The obstacle detection unit 20 detects a relative position of the obstacle B with respect to the vehicle A and calculates the distance from the vehicle A to the obstacle B.

The obstacle detection unit 20 detects the position of the obstacle B by transmitting electromagnetic waves and receiving the electromagnetic waves reflected off a reflection point of the obstacle B. In particular, a sensor that transmits or receives electromagnetic waves may be provided at a rear end of the vehicle A.

Specifically, the obstacle detection unit 20 is connected to the radar sensor 10 provided at each of the opposite rear ends of the vehicle A and detects the position of the obstacle B positioned behind or beside the vehicle A.

The radar sensor 10 emits electromagnetic waves, such as microwaves, to the obstacle B, and receives the electromagnetic waves reflected off the obstacle B, thereby detecting the distance, the direction, the altitude, and the like with respect to the obstacle B. The radar sensor 10 is provided at the opposite sides of the vehicle A and may be provided at the rear end of the vehicle A. A detection area of the radar sensor 10 may be an angular range extending from the rear of the vehicle A to opposite sides.

In addition, the obstacle detection unit 20 may detect multiple positions of the obstacle B, and may use a change in position of the detected obstacle B so as to calculate the speed of the obstacle B. In particular, the obstacle detection unit 20 may separate the distance between the vehicle A and the obstacle B, and the speed of the obstacle B into a longitudinal-direction component and a lateral-direction component.

The collision determination unit 40 may determine the possibility of a collision between the vehicle A and the obstacle B by using the distance between the vehicle A and the obstacle B and the speed of the obstacle B that are calculated on the basis of a position of the obstacle B and another position of the obstacle B.

According to an embodiment of the inventive concepts, the collision determination unit 40 may determine the possibility of a collision with the obstacle B on the basis of the traveling direction of the obstacle B estimated by the direction estimation unit 30. Specifically, even though it may be determined that there is possibility of a collision according to the distance between the vehicle A and the obstacle B and the speed of the obstacle B that are calculated on the basis of a position of the obstacle B and another position of the obstacle B detected by the obstacle detection unit 20, the collision determination unit 40 may determine that there is no possibility of a collision between the vehicle A and the obstacle B considering the traveling direction of the obstacle B estimated by the direction estimation unit 30.

Figure 3:
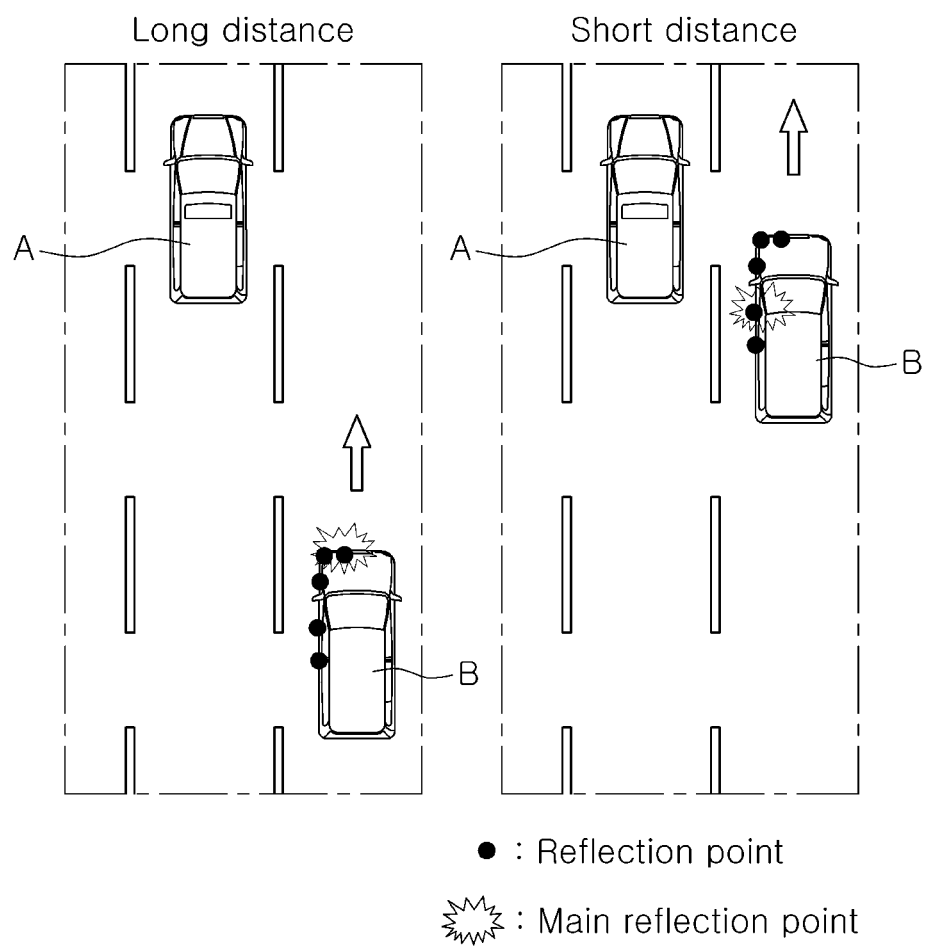
FIG. 3 is a diagram illustrating a reflection point and a main reflection point of an obstacle positioned a long distance and a short distance from a vehicle when the obstacle and the vehicle travel parallel to each other.

FIG. 3 is a diagram illustrating a reflection point and a main reflection point of the obstacle B positioned a long distance and a short distance from the vehicle A when the obstacle B and the vehicle A travel parallel to each other.

Referring to FIG. 3, the radar sensor 10 provided at the rear end of the vehicle A may detect a position of the obstacle B positioned behind and beside the vehicle A. Reflection points of the obstacle B may be positioned on a front part and a side part adjacent to the vehicle A.

Specifically, when the obstacle B is positioned a long distance from the rear of the vehicle A, a main reflection point is positioned at the front part of the obstacle B. When the obstacle B is positioned a short distance from the vehicle A, a main reflection point is positioned at the side part of the obstacle B. A long distance may be considered when the obstacle B is positioned at least one or car-lengths away from vehicle A up to a point where the obstacle B overtakes vehicle A. A short distance may be considered when obstacle B beings to overtake vehicle A and some portion of obstacle B is astride vehicle A.

According to the related art, there is a problem as follows. When the obstacle B is spaced apart from the vehicle A in a lateral direction and travels parallel to the longitudinal direction of the vehicle A, there is no possibility of a collision between the obstacle B and the vehicle A. However, as a main reflection point for the vehicle A moves in the lateral direction, it is erroneously determined that the obstacle B travels in the lateral direction.

Figure 4:
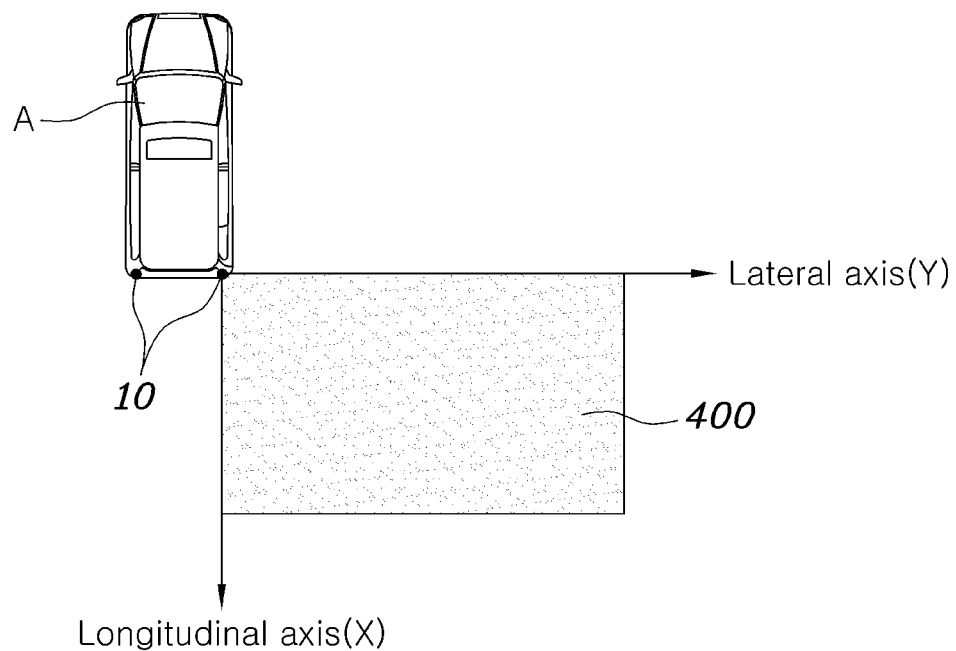
FIG. 4 is a diagram illustrating a preset area according to an embodiment of the present disclosure.

Herein, the longitudinal direction of the vehicle A refers to a full-length direction of the vehicle A. The lateral direction of the vehicle A refers to a full-width direction of the vehicle A (as illustrated in FIG. 4). The main reflection point refers to the reflection point that is detected as the closest to the vehicle A among the reflection points of the obstacle B, or refers to the reflection point off which the electromagnetic wave having the greatest level of a reception signal is reflected.

Therefore, the collision determination unit 40 according to an embodiment of the inventive concepts may determine the possibility of a collision with the obstacle B on the basis of the traveling direction of the obstacle B estimated by the direction estimation unit 30.

The obstacle detection unit 20 uses the detected position of the obstacle B to calculate a lateral distance from the vehicle A to the obstacle B and a lateral speed of the obstacle B. The collision determination unit 40 calculates the time to collision on the basis of the calculated lateral distance and the calculated lateral speed. When the obstacle B is positioned within a preset area and the time to collision is equal to or less than a preset time, the collision determination unit 40 determines that there is the possibility of a collision with the obstacle B.

Specifically, the obstacle detection unit 20 may calculate the distance from the vehicle A to the obstacle B and the speed of the obstacle B on the basis of the position of the obstacle B. In particular, the obstacle detection unit 20 may separate the distance to the obstacle B and the speed of the obstacle B into a longitudinal-direction component and a lateral-direction component by using the distance to the detected position of the obstacle B and the direction thereto.

The collision determination unit 40 calculates the time to collision on the basis of the calculated lateral distance and the calculated lateral speed. When the obstacle B is positioned within the preset area and the time to collision is equal to or less than the preset time, the collision determination unit 40 determines that there is the possibility of a collision with the obstacle B.

FIG. 4 is a diagram illustrating a preset area 400 according to an embodiment of the inventive concepts.

FIG. 4 illustrates the preset area 400 for the obstacle B detected by the radar sensor 10 provided at the right rear end of the vehicle A. A different preset area for the obstacle B detected by the radar sensor 10 provided at the left rear end of the vehicle A may be preset to be symmetrical with the above-described preset area.

In addition, the collision determination unit 40 calculates the time to collision (TTC), and when the calculated time to collision is equal to or less than the preset time, the collision determination unit 40 determines that there is the possibility of a collision with the obstacle B. As an embodiment, the time to collision may be calculated using the following equation.

$$TTC_k = -\frac{Y \text{ axis Position}}{Y \text{ axis Velocity}} = -\frac{Y_k}{Yvel_k}$$

k kth radar frame
TTC: Time To Collision

In particular, when the obstacle B is positioned within the preset area and simultaneously the time to collision is equal to or less than the preset time, the collision determination unit 40 determines that there is the possibility of a collision with the obstacle B.

Figure 5:
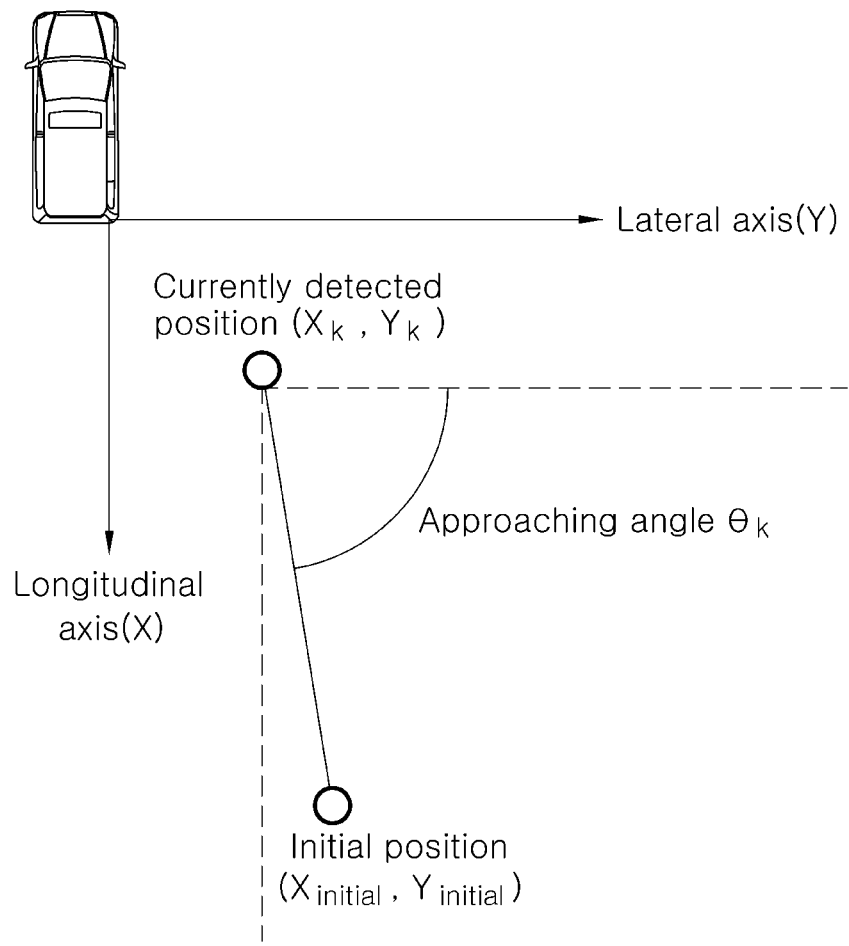
FIG. 5 is a diagram illustrating a method of estimating a traveling direction of an obstacle according to an embodiment of the present disclosure.
Figure 6:
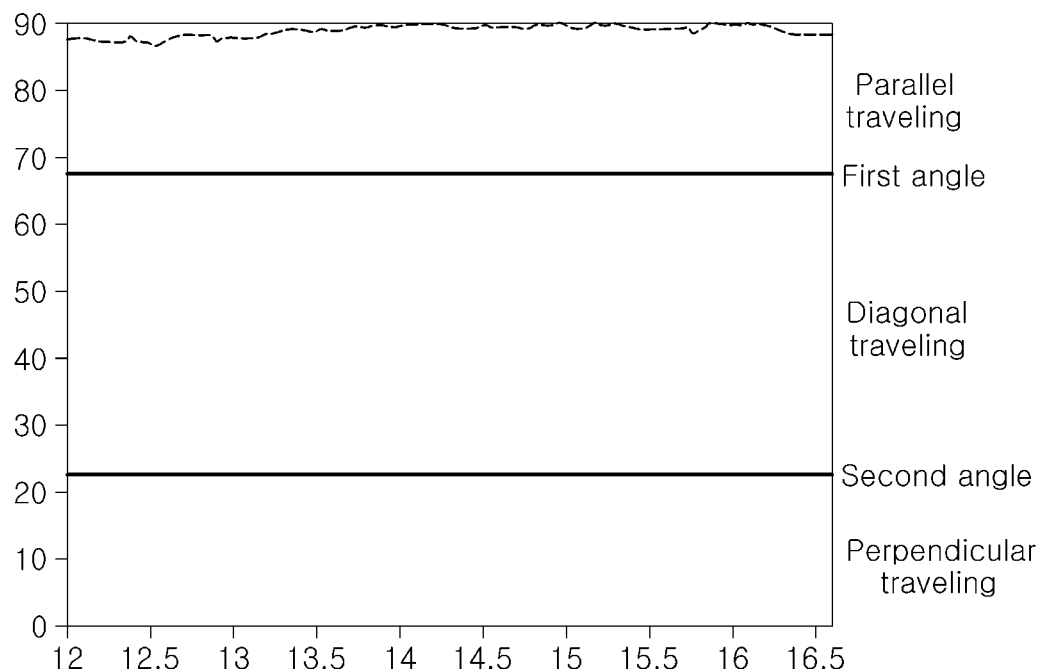
FIG. 6 is a graph illustrating a traveling direction of an obstacle depending on an approaching angle of the obstacle.

FIG. 5 is a diagram 500 illustrating a method of estimating a traveling direction of an obstacle B according to an embodiment of the inventive concepts. FIG. 6 is a graph illustrating a traveling direction of an obstacle B according to an approaching angle of the obstacle B.

Referring to FIGS. 5 and 6, the direction estimation unit 30 collects the multiple positions of the obstacle B detected by the obstacle detection unit 20, and uses the collected positions of the obstacle B to calculate a ratio between a change in the longitudinal position of the obstacle B and a change in the lateral position of the same, thereby estimating the traveling direction of the obstacle B.

The obstacle detection unit 20 detects the position of the obstacle B in real time and thus detects multiple positions of the obstacle B. The direction estimation unit 30 calculates a change in the position of the obstacle B by using the multiple positions of the obstacle B. As an embodiment, the direction estimation unit 30 may estimate the traveling direction of the obstacle B by using a change between the current position of the obstacle B and the previously detected position.

In particular, the direction estimation unit 30 calculates a ratio between a change in the longitudinal position and a change in the lateral position that occur between the initial position of the obstacle B first detected and the current position of the obstacle B, thereby estimating the traveling direction of the obstacle B in real time.

Specifically, the approaching angle $\theta_k$ of the obstacle B is estimated as demonstrated in the following equation. Herein, the approaching angle $\theta_k$ of the obstacle B is an angle between the lateral axis of the vehicle A and the traveling direction of the obstacle B.

$$\theta_k = \tan^{-1}\left(\frac{X_k - X_{initial}}{Y_k - Y_{initial}}\right)$$

Because the amount of change from the initial position to the current position of the obstacle B is used, even though the reflection point for recognizing the obstacle B varies, the approaching angle $\theta_k$ does not change significantly. Accordingly, the possibility of a collision with the obstacle B is not erroneously determined.

As illustrated in FIG. 6, when the approaching angle $\theta_k$ is equal to or greater than a first angle, it is determined that the obstacle B travels parallel to the vehicle. When the approaching angle $\theta_k$ is less than a second angle, it is determined that the obstacle B travels perpendicular to the vehicle. In addition, when the approaching angle $\theta_k$ is less than the first angle and is equal to or greater than the second angle, it is determined that the obstacle B travels diagonally.

When the approaching angle $\theta_k$ between the estimated traveling direction of the obstacle B and the lateral axis of the vehicle A is within a preset angle range, the collision determination unit 40 determines that there is no possibility of a collision with the obstacle B. Herein, the preset angle range may be preset to be equal to or greater than the first angle, and to be equal to or less than a right angle (a 90 degree angle).

The preset angle range may be preset to be larger than the change in the approaching angle $\theta_k$ which is caused by the movement of the main reflection point as the obstacle B travels parallel to the vehicle A. In addition, the preset angle range may be preset to be smaller than the change in the approaching angle $\theta_k$ of the case where the angle of the obstacle B changes near the vehicle A and the obstacle B is actually likely to collide with the vehicle A.

Figure 7:
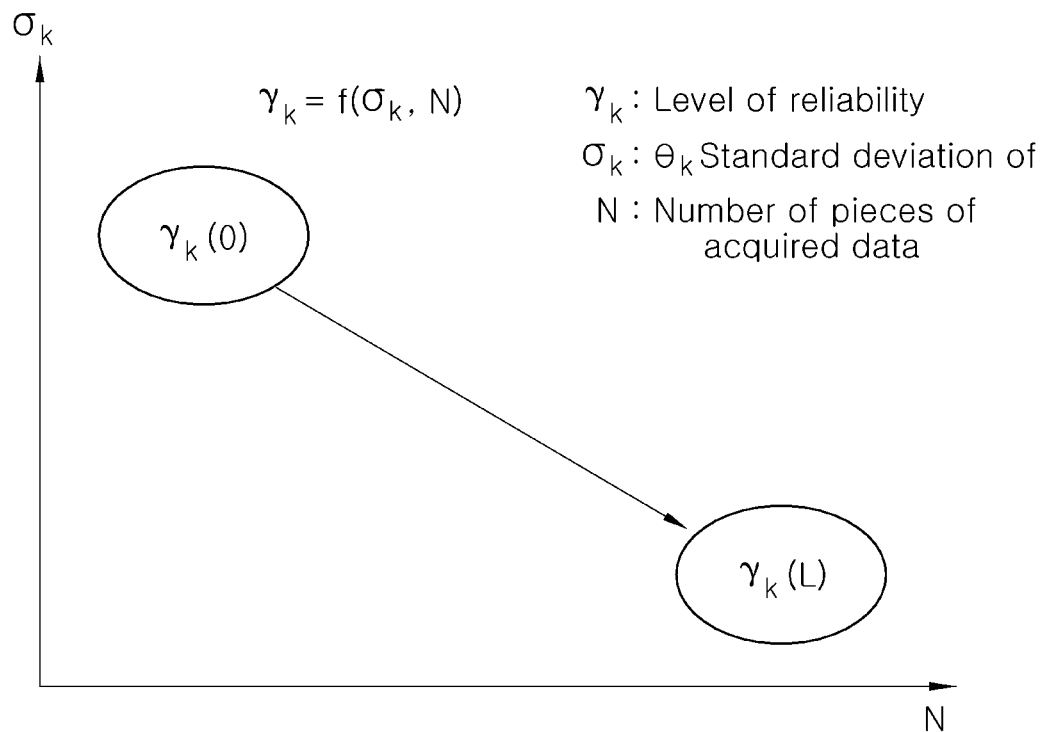
FIG. 7 is a graph illustrating a level of reliability according to an embodiment of the present disclosure.

FIG. 7 is a graph illustrating a level of reliability according to an embodiment of the inventive concepts.

Referring to FIG. 7, the system further includes a reliability evaluation unit 50 that collects multiple traveling directions of the obstacle B estimated by the direction estimation unit 30, and evaluates an estimated level of reliability for the traveling direction of the obstacle B by using the number of the collected traveling directions and the variance or standard deviation between the collected traveling directions. $\theta_k$ Further, when the estimated level of reliability evaluated by the reliability evaluation unit 50 is equal to or greater than a preset level of reliability, the collision determination unit 40 determines the possibility of a collision with the obstacle B on the basis of the traveling direction of the obstacle B.

As illustrated in FIG. 7, the estimated level of reliability $\gamma_k$ for the traveling direction of the obstacle B may equal a function having, as variables, the number of the collected traveling directions and the variance or standard deviation between the collected traveling directions.

The estimated level of reliability for the traveling direction of the obstacle B is proportional to the number of the collected traveling directions and is inversely proportional to the variance or standard deviation ok between the collected traveling directions.

When the estimated level of reliability evaluated by the reliability evaluation unit 50 is equal to or greater than the preset level of reliability, the collision determination unit 40 determines the possibility of a collision with the obstacle B on the basis of the traveling direction of the obstacle B.

Specifically, when the estimated level of reliability is equal to or greater than the preset level of reliability and the approaching angle according to the traveling direction of the obstacle B is within the preset angle range, it is determined that there is no possibility of a collision with the obstacle B.

When it is determined that the approaching angle $\theta_k$ according to the traveling direction of the obstacle B is within the preset angle range and there is no possibility of a collision with the obstacle B, the collision determination unit 40 immediately determines that there is no possibility of a collision, as an embodiment.

According to another embodiment, the collision determination unit 40 may set the lateral speed of the obstacle B by using the lateral speed of the obstacle B previously detected and the lateral speed of the obstacle B currently detected on the basis of the obstacle B of the traveling direction.

Specifically, when the time to collision calculated using the lateral speed of the obstacle B is within the preset time, the collision determination unit 40 determines that there is the possibility of a collision.

Therefore, when it is determined that the approaching angle $\theta_k$ according to the traveling direction of the obstacle B is within the preset angle range, the collision determination unit 40 sets the lateral speed of the obstacle B by using the lateral speed of the obstacle B previously detected and the lateral speed of the obstacle B currently detected. Specifically, the lateral speed of the obstacle B configured to calculate the time to collision is corrected as illustrated in the following equation.

$$Y_{vel} = \alpha \cdot Y_{vel,k} + \beta \cdot Y_{vel,k-1}$$

Herein, $Y_{vel,k}$ is a lateral speed that is currently detected, $Y_{vel,k-1}$ is the lateral speed that is just previously detected, and α and β are scaling factors.

The factors α and β may be preset to satisfy the equation α+β=1.

Figure 8:
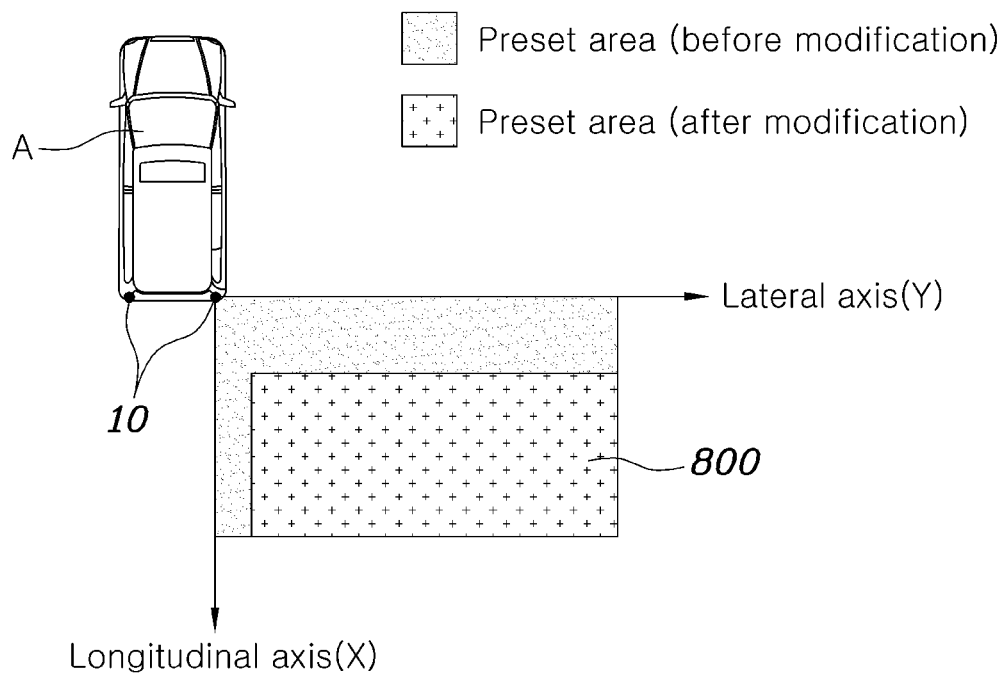
FIG. 8 is a diagram illustrating a change in a preset area an embodiment of the present disclosure.

FIG. 8 is a diagram illustrating a change in a preset area an embodiment of the inventive concepts.

Referring to FIG. 8, the collision determination unit 40 may modify the previous preset area to be another present area 800 so as to exclude a part of an area adjacent to the vehicle A from the another preset area 800 on the basis of the traveling direction of the obstacle B.

Specifically, when it is determined that the approaching angle according to the traveling direction of the obstacle B is within the preset angle range, the previous preset area 400 is modified so as to be smaller than before. In particular, the previous preset area 400 may be modified so as to exclude the area that is adjacent to the rear of the vehicle A in the longitudinal direction. That is, the previous preset area 400 may be modified to be defined as being spaced apart from the vehicle A by a predetermined distance in the backward direction and as being spaced apart by a predetermined distance in the lateral direction.

Accordingly, when the obstacle B travels behind the vehicle A and is positioned a short distance from the vehicle A and the main reflection point also moves, it is determined there is no possibility of a collision.

The system further includes a notification providing unit 60 that provides the driver a notification when there is the possibility of a collision with the obstacle B determined by the collision determination unit 40. The notification providing unit 60 may provide a notification in a visual manner, a tactile manner, a vibrating manner, etc, by using a device, such as an instrument cluster, an Audio, Video and Navigation (AVN) device, or the like.

The notification providing unit 60 determines whether the vehicle A is put in R gear (reverse gear). Only when the vehicle A is put in R gear, the notification providing unit 60 provides the driver the notification.

As another embodiment, the obstacle detection unit 20, the direction estimation unit 30, or the collision determination unit 40 determines whether the vehicle A is put in R gear. Only in the case of R gear, the obstacle B is detected, the direction is estimated, or the possibility of a collision is determined.

Although a particular embodiment if the inventive concepts has been described for illustrative purposes, those skilled in the art will appreciate that various modifications, additions, and substitutions are possible, without departing from the technical idea of the disclosure as disclosed in the accompanying claims.

What is claimed is:

1. A system configured to avoid a rear-cross traffic collision, the system comprising:
   an obstacle detection unit that detects a position of an obstacle by receiving electromagnetic waves reflected off a reflection point of the obstacle;
   a direction estimation unit that estimates a traveling direction of the obstacle on the basis of the position of the obstacle detected by the obstacle detection unit; and
   a collision determination unit that determines a possibility of a collision with the obstacle on the basis of the traveling direction of the obstacle estimated by the direction estimation unit,
   wherein the direction estimation unit collects the multiple positions of the obstacle detected by the obstacle detection unit, and uses the multiple collected positions of the obstacle to calculate a ratio between a change in a longitudinal position of the obstacle and a change in a lateral position of the obstacle that occur between an initial position of the obstacle first detected and a current position of the obstacle, thereby estimating the traveling direction of the obstacle in real time.

2. The system of claim 1, wherein the obstacle detection unit is connected to a radar sensor provided at each of opposite rear ends of a vehicle and detects the position of the obstacle positioned behind or beside the vehicle.

3. The system of claim 1, wherein when an approaching angle between the estimated traveling direction of the obstacle and a lateral axis of a vehicle is within a preset angle range, the collision determination unit determines that there is no possibility of a collision with the obstacle.

4. The system of claim 3, wherein the obstacle detection unit calculates a lateral distance from the vehicle to the obstacle or a lateral speed of the obstacle by using the detected position of the obstacle, and
   when the amount of change in the lateral distance to the obstacle or in the lateral speed of the obstacle is equal to or less than a preset amount of change, the collision determination unit determines that there is no possibility of a collision with the obstacle.

5. The system of claim 1, further comprising:
   a reliability evaluation unit that collects the multiple traveling directions of the obstacle estimated by the direction estimation unit, and evaluates an estimated level of reliability for the traveling direction of the obstacle by using the number of the collected traveling directions and a variance or standard deviation between the collected traveling directions,
   wherein when the estimated level of reliability evaluated by the reliability evaluation unit is equal to or greater than a preset level of reliability, the collision determination unit determines the possibility of a collision with the obstacle on the basis of the traveling direction of the obstacle.

6. The system of claim 1, wherein the obstacle detection unit calculates a lateral distance from a vehicle to the obstacle and a lateral speed of the obstacle by using the detected position of the obstacle, and
   the collision determination unit calculates time to collision on the basis of the calculated lateral distance and the calculated lateral speed, and determines that there is the possibility of a collision with the obstacle when the obstacle is positioned within a preset area and the time to collision is equal to or less than a preset time.

7. The system of claim 6, wherein the collision determination unit sets the lateral speed of the obstacle by using the lateral speed of the obstacle previously detected and the lateral speed of the obstacle currently detected on the basis of the traveling direction of the obstacle.

8. The system of claim 6, wherein the collision determination unit modifies the preset area so as to exclude a part of an area adjacent to the vehicle from the preset area on the basis of the traveling direction of the obstacle.

9. The system of claim 1, further comprising:
   a notification providing unit that provides a notification to a driver of a vehicle when there is the possibility of a collision with the obstacle determined by the collision determination unit.

10. A method of avoiding a rear-cross traffic collision, the method comprising:
    receiving electromagnetic waves reflected off a reflection point of an obstacle by a vehicle, and detecting a position of the obstacle;

estimating a traveling direction of the obstacle on the basis of the detected position of the obstacle; and determining possibility of a collision with the obstacle on the basis of the detected position of the obstacle or the estimated traveling direction of the obstacle, wherein at the detecting of the position of the obstacle, a lateral distance from the vehicle to the obstacle and a lateral speed of the obstacle are calculated using the detected position of the obstacle, and at the determining of the possibility of a collision with the obstacle, time to collision is calculated on the basis of the calculated lateral distance and the calculated lateral speed, and when the obstacle is positioned within a preset area and the time to collision is equal to or less than a preset time, it is determined that there is the possibility of a collision with the obstacle.

11. The method of claim 10, wherein at the estimating of the traveling direction of the obstacle, the multiple detected positions of the obstacle are collected, and the multiple collected positions of the obstacle are used to calculate a ratio between a change in a longitudinal position of the obstacle and a change in a lateral position of the obstacle, thereby estimating the traveling direction of the obstacle.

12. The method of claim 10, wherein at the determining of the possibility of a collision with the obstacle, when an approaching angle between the estimated traveling direction of the obstacle and a lateral axis of the vehicle is within a preset angle range, it is determined that there is no possibility of a collision with the obstacle.

13. A system configured to avoid a rear-cross traffic collision, the system comprising:

an obstacle detection unit that detects a position of an obstacle by receiving electromagnetic waves reflected off a reflection point of the obstacle;

a direction estimation unit that estimates a traveling direction of the obstacle on the basis of the position of the obstacle detected by the obstacle detection unit; and a collision determination unit that determines a possibility of a collision with the obstacle on the basis of the traveling direction of the obstacle estimated by the direction estimation unit, wherein when an approaching angle between the estimated traveling direction of the obstacle and a lateral axis of a vehicle is within a preset angle range, the collision determination unit determines that there is no possibility of a collision with the obstacle.

* * * * *